United States Patent
Flockhart et al.

(10) Patent No.: US 8,953,775 B2
(45) Date of Patent: Feb. 10, 2015

(54) SYSTEM, METHOD, AND APPARATUS FOR DETERMINING EFFECTIVENESS OF ADVANCED CALL CENTER ROUTING ALGORITHMS

(71) Applicant: Avaya Inc., Basking Ridge, NJ (US)

(72) Inventors: Andrew D. Flockhart, Thornton, CO (US); Robert C. Steiner, Broomfield, CO (US); Joylee Kohler, Colorado Springs, CO (US)

(73) Assignee: Avaya Inc., Basking Ridge, NJ (US)

( * ) Notice: Subject to any disclaimer, the term of this patent is extended or adjusted under 35 U.S.C. 154(b) by 154 days.

(21) Appl. No.: 13/623,267

(22) Filed: Sep. 20, 2012

(65) Prior Publication Data

US 2014/0079211 A1    Mar. 20, 2014

(51) Int. Cl.
H04M 3/00 (2006.01)
H04M 5/00 (2006.01)

(52) U.S. Cl.
USPC ............ 379/266.08; 379/265.01; 379/265.02; 379/265.05

(58) Field of Classification Search
CPC ......... H04M 3/36; H04M 3/51; H04M 3/523; H04M 3/5158; H04M 3/5166; H04M 3/5175; H04M 3/5183; H04M 3/5191; H04M 3/5233; H04M 3/5238; H04M 2203/2011; G06Q 10/06
USPC ............. 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS

| | | | |
|---|---|---|---|
| 5,915,011 A | 6/1999 | Miloslavsky | |
| 6,163,607 A | 12/2000 | Bogart et al. | |
| 6,173,053 B1 | 1/2001 | Bogart et al. | |
| 6,714,643 B1 | 3/2004 | Gargeya et al. | |
| 6,922,466 B1 | 7/2005 | Peterson et al. | |
| 7,568,038 B1 | 7/2009 | Ezerzer et al. | |
| 7,912,205 B2 | 3/2011 | Dezonno et al. | |
| 7,936,867 B1 | 5/2011 | Hill et al. | |
| 7,949,121 B1 | 5/2011 | Flockhart et al. | |
| 8,094,804 B2 | 1/2012 | Flockhart et al. | |
| 2009/0122973 A1 | 5/2009 | Jay et al. | |
| 2009/0190743 A1* | 7/2009 | Spottiswoode | 379/265.11 |
| 2010/0111285 A1* | 5/2010 | Chishti | 379/265.11 |
| 2010/0235218 A1 | 9/2010 | Erhart et al. | |
| 2010/0296417 A1 | 11/2010 | Steiner | |
| 2011/0078329 A1* | 3/2011 | Steiner | 709/244 |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |
| 2011/0276392 A1* | 11/2011 | Vaver et al. | 705/14.43 |
| 2012/0321070 A1* | 12/2012 | Smith et al. | 379/265.09 |

* cited by examiner

*Primary Examiner* — Khai N Nguyen
(74) *Attorney, Agent, or Firm* — Sheridan Ross P.C.

(57) ABSTRACT

A contact center is described along with various methods and mechanisms for administering the same. The contact center proposed herein provides the ability to, among other things, simultaneously execute two different work assignment algorithms on the same work flow either in real-time as the work flow is received or in a simulation environment. The differences in the way that each work assignment algorithm handles the same work flow are compared and contrasted to help describe the differences in the work assignment algorithms.

20 Claims, 4 Drawing Sheets

SYSTEM, METHOD, AND APPARATUS FOR DETERMINING EFFECTIVENESS OF ADVANCED CALL CENTER ROUTING ALGORITHMS

FIELD OF THE DISCLOSURE

The present disclosure is generally directed toward communications and more specifically toward contact centers.

BACKGROUND

Contact center providers are known to offer premium contact center solutions in addition to providing traditional solutions. Business Advocate is one example of a premium contact center tool offered by Avaya, Inc. Details of the mechanisms employed by Business Advocate are described, for example, in U.S. Pat. No. 8,094,804 to Flockhart et al., the entire contents of which are hereby incorporated herein by reference.

Other premium contact center solutions are advertised to manage all voice, email, and Web chat interactions via a single universal queue, intelligently routing customers in real time to the best agent for their needs. Certain premium solutions take into account pre-established business objectives; customer needs and business value; and the skills and availability of the current agent pool.

It is often difficult to justify the additional costs associated with employing the premium contact center tool without hard evidence to prove the increases in efficiency. Specifically, the differences in performance metrics (e.g., Average Speed of Answer (ASA), % Service Level (% SL), etc.) have never been quantified for the performance of premium services versus other solutions, especially for those predictive tools such as Business Advocate.

SUMMARY

It is with respect to the above issues and other problems that the embodiments presented herein were contemplated. In particular, embodiments of the present disclosure propose, as an example, the ability to identify discrete instances where one contact center solution (e.g., Business Advocate) resulted in a "save" of the contact center performance whereas another solution would not have resulted in a "save." The term "save" is considered to be an instance where a performance objective is not violated under operation of one contact center solution but the same performance objective would have been violated under operation of a different contact center solution (e.g., a non-premium contact center solution). More specifically, an adaptive mechanism is provided that will allow a counting of a number of discrete saves by using any premium contact center tool. By highlighting discrete save instances, it becomes easier for the customer to determine a Return on Investment (RoI) and appreciate the value of the adaptive features offered by the premium contact center tool.

In some embodiments, the save instances are determined by running a first algorithm (e.g., an adaptive contact center solution as described in any one of U.S. Pat. Nos. 5,915,011; 6,163,607; 6,173,053; 6,714,643; 7,568,038; 7,912,205; 7,936,867; 7,949,121; and 8,094,804, each of which are hereby incorporated herein by reference in their entirety), either in simulation or in real-time, for a first call flow and then running a second algorithm either in simulation or also in real-time for the same first call flow. If both algorithms are run simultaneously in real-time, then only one algorithm may have its routing decisions enforced.

As the different algorithms work on the same call flow, it will become possible to identify instances where one algorithm resulted in one or more performance objectives being violated whereas the other algorithm saved the performance objectives from being violated. These instances can be totaled or otherwise presented to the customer to help describe the differences between the algorithms and what happened to create the different results.

In addition to showing the discrete number of save instances, it may also be possible to track differences in performance metrics after one or more saves occur. More specifically, there is often a domino effect of saving a single contact from missing its performance objectives. Usually, if one contact would have missed its performance objective, multiple other contacts would have missed their performance objectives as well. Certain premium contact center tools have been built to move additional resources to a skill that is predicted to have problems in the future. When a resource is moved into a skill (e.g., a resource is moved from handling work of one type to handling work of a different type), the movement of that resource may count as a single save instance, but multiple contacts may have been saved by the addition of the resource to the skill. The present disclosure proposes maintaining information about performance metrics with a premium contact center solution as well as what the values of those performance metrics would have been if the premium contact center solution was not used. These differences can be identified in reports or multiple reports can be generated (one for using the premium contact center solution and one for not using the premium contact center solution) to show how the performance metrics were impacted.

An alternative embodiment is to simply run a premium contact center solution that employs an adaptive algorithm and count the number of times that the adaptive algorithm was invoked. For example, U.S. Pat. No. 8,094,804 uses a metric of Required Queue Position (RQP) to predict whether the contact center is headed toward a future risk state. If such a state is detected, then the work assignment logic takes the initiative and adds additional resources to the skill determined to have the future risk state until the future risk state is no longer predicted. In this scenario, it is not necessary to also run a simulation with another algorithm to realize the effects of the adaptive algorithm. It may be possible to highlight just how useful the adaptive algorithm was in this instance of a save, but the instance of the save can be recorded as a discrete save that was performed by the adaptive algorithm.

Stated another way, prior art solutions attempt to justify premium services based on analyzing long-term gains in efficiency or by using historical case studies. This justification is often not as persuasive as identifying discrete points in time where a premium solution (e.g., an adaptive solution) invoked its functionality and created an instance of a save, thereby adding discrete value at a specific point in time. It is, therefore, an aspect of the present disclosure to provide the operation of an adaptive call center solution and identification of discrete points in time where the adaptive solution saved some aspect of the contact center performance.

In accordance with at least some embodiments of the present disclosure, a method is provided which generally comprises:

providing a first work flow to a first work assignment algorithm;

providing the first work flow to a second work assignment algorithm;

analyzing a contact center behavior in response to the first work assignment algorithm processing the first work flow;

analyzing the contact center behavior in response to the second work assignment algorithm processing the first work flow; and based on the analysis of the contact center behavior in response to both the first and second work assignment algorithms processing the first work flow, identifying at least one discrete point in time where the first work assignment algorithm performs an adaptive function and the second work assignment algorithm does not perform an adaptive function.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
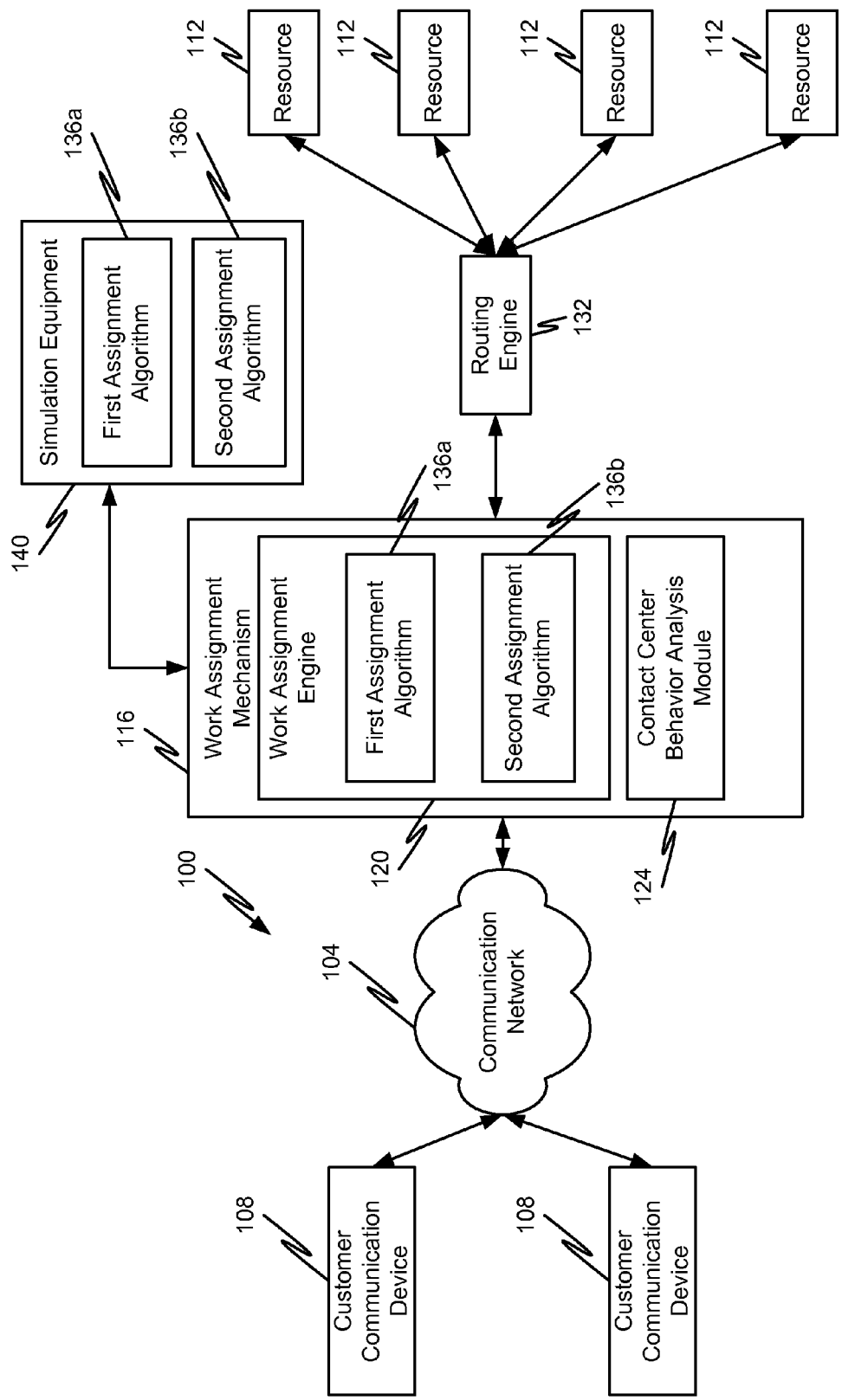
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No.

12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a contact that spawns the creation of the work item, which is generally a request for a processing resource 112. Exemplary work items correspond to, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which are hereby incorporated herein by reference in their entirety.

The format of the work item may depend upon the capabilities of the communication device 108 and the format of the communication. In some embodiments, work items are logical representations within a contact center (e.g., the work assignment mechanism 116 of the contact center) of work to be performed in connection with servicing a communication/contact received at the contact center. The communication or contact associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112. The connection between the customer communication device 108 and a resource 112 may be effected by the routing engine 132 assigning one or more communication resources (e.g., sockets, buffers, physical ports, etc.) to establish a communication path (e.g., media stream such as RTP or SRTP) between the communication device 108 and resource 112. In some embodiments, the communication path established between the communication device 108 and resource 112 may also carry call control signaling, however, it may also be possible to maintain the signaling path at the work assignment mechanism 116. Alternatively, the customer communication device 108 may be initially connected to a conference bridge or the like by the routing engine 132 before any resource 112 is assigned to the contact. The work assignment mechanism 116 may later decide which resource(s) 112 are going to be assigned to the contact and, upon making such a decision, instruct the routing engine 132 to connect the selected resource(s) 112 to the conference bridge where the contact is being parked.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, tablet, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 may be equipped with multiple different work assignment algorithms (e.g., a first work assignment algorithm 136a and a second work assignment algorithm 136b). In operation, the work assignment engine 120 may comprise the ability to switch between having the first work assignment algorithm 136a or the second work assignment algorithm 136b control the behavior of the contact center. In other words, the work assignment engine 120 may be configured to switch between using either the first work assignment algorithm 136a or the second work assignment algorithm 136b.

In accordance with at least some embodiments of the present disclosure, the first work assignment algorithm 136a may be different from the second work assignment algorithm 136b in that the first work assignment algorithm 136a is configured to perform one or more adaptive functions whereas the second work assignment algorithm 136b is not configured to perform the same adaptive functions. As an example, the first work assignment algorithm 136a may correspond to a predictive work assignment algorithm, such as those described in U.S. Pat. No. 8,094,804 to Flockhart et al. The second work assignment algorithm 136b, on the other hand, may not be configured to predict future risk states of the contact center. This means that even if the same work flow (e.g., a first work flow 204 depicted in FIG. 2) is provided to both algorithms 136a, 136b, the contact center will behave differently if one algorithm is active versus the other (e.g., one algorithm's decisions are controlling the operation of the contact center whereas the other algorithm's decisions are not).

It should be appreciated that the algorithms 136a, 136b executed by the work assignment engine 120 may be configured for traditional queue-based contact centers, queueless contact centers, or both. For example, the first work assignment algorithm 136a may correspond to an algorithm used to administer a queueless contact center where true one-to-one matching is possible whereas the second work assignment algorithm 136b may correspond to an algorithm used in traditional queue-based contact centers. It may also be possible that both work assignment algorithms 136a, 136b are configured to administer a queueless contact center or both work assignment algorithms 136a, 136b are configured to administer a queue-based contact center.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

Figure 2:
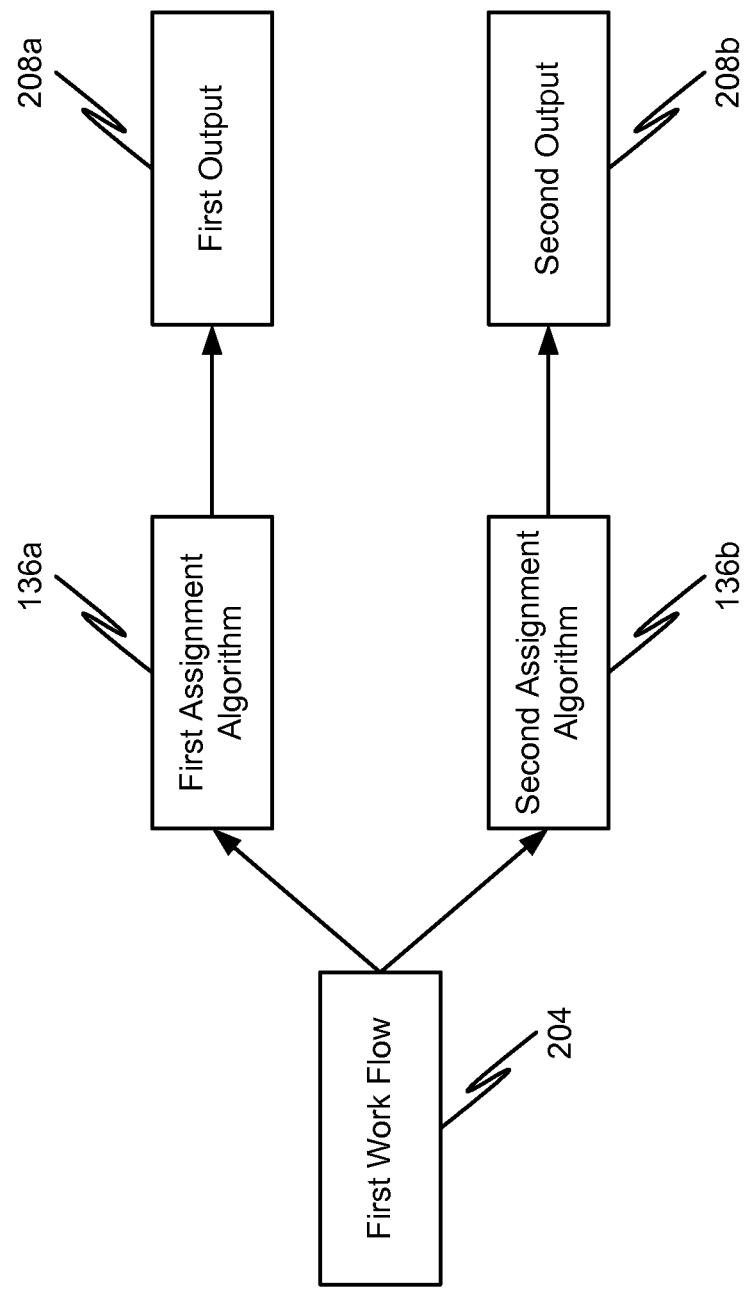
FIG. 2 is a block diagram depicting work flow processing in accordance with embodiments of the present disclosure.

In some embodiments, one or both of the work assignment algorithms 136a, 136b may be provided on simulation equipment 140. The simulation equipment 140 may correspond to any type of server or collection of automated processing resources that are able to simulate the behavior of the algorithms 136a, 136b within the work assignment engine 120. In some embodiments, the simulation equipment 140 may be identical to the work assignment engine 120 except that outputs from the algorithms 136a, 136b are not used to influence the behavior of the contact center (e.g., the outputs are not provided to the routing engine 132). The communications between the simulation equipment 140 and the work assignment mechanism 116 may be bidirectional so that outputs of the algorithms 136a, 136b from the simulation equipment 140 can be provided back to an analysis module 124 contained in the work assignment mechanism 116. Moreover, the work assignment mechanism 116 may provide actual work flow data (e.g., a copy of actual work flow being processed in the work assignment engine 120) to the simulation equipment 140. This work flow data is depicted in FIG. 2 as the first work flow 204.

In some embodiments, the first work flow 204 comprises a complete description of the work flow being processed by the contact center at a given point in time and over the course of time. More specifically, the first work flow 204 may comprise information related to volume of contacts in the contact center, rate of new incoming contacts, rate of contact disposal, KPI metrics for contacts, KPI metrics for agents, rate of incoming work items as a function of time, processing requirements for every work item in the contact center, and any other information that describes how work items are received and/or processed within the contact center. The work flow 204 may correspond to actual and real-time work flow in the contact center, historical work flow for the contact center, simulated or expected work flow in the contact center, or combinations thereof.

Since the work flow 204 may be actual real-time data or simulated data, it should be appreciated that the functions of the simulation equipment 140 may be executed by the work assignment engine 120. In other words, the work assignment engine 120 may provide a single work flow 204 to both work assignment algorithms 136a, 136b and each work assignment algorithm may process that work flow independently to produce separate outputs 208a, 208b, respectively. The outputs 208a, 208b may correspond to work assignment decisions or any other actions taken within the contact center as a result of applying the work assignment algorithm 136a, 136b.

The work assignment engine 120 may be configured to provide only one output 208a, 208b to the routing engine 132 but both outputs 208a, 208b may be provided to the contact center behavior analysis module 124 to determine the differences in contact center behavior in response to the outputs 208a, 208b of each algorithm 136a, 136b.

In addition to comprising the work assignment engine 120, the work assignment mechanism 116 may also comprise the contact center behavior analysis module 124. The behavior analysis module 124 may be configured to monitor and assess the state of the contact center 100 on a continual or periodic basis. Moreover, the behavior analysis module 124 may be configured to compare the behavior of the contact center under the first output 208a with the behavior of the contact center under the second output 208b. In other words, the behavior analysis module 124 may be configured to identify differences in the contact center behavior when the work assignment engine 120 is employing the first assignment algorithm 136a versus when the work assignment engine 120 is employing the second assignment algorithm 136b. In some embodiments, the behavior analysis module 124 may be configured to analyze both outputs 208a, 208b for the single work flow 204 input and determine the differences in how those outputs would impact contact center performance. The differences may be analyzed both historically as well as at discrete points in time. For instance, the behavior analysis module 124 may be configured to identify when the contact center would fail to meet some pre-defined objective under one or both algorithms 136a, 136b.

Specifically, the behavior analysis module 124 may be responsible for monitoring one or more agent performance metrics (e.g., KPIs, schedule adherence, overall profitability, skill improvements, etc.) for some or all agents in the contact center 100 and comparing those metrics with one or more Service Level Objectives or SLOs—this may be performed under both the first output 208a and second output 208b. The behavior analysis module 124 may then prepare a report describing the differences in contact center behavior when the first output 208a is used versus when the second output 208b is used.

Information monitored and analyzed by the behavior analysis module 124 for both algorithms 136a, 136b may include information which describes an agent's current or historical (e.g., past hour, day, week, month, quarter, year, recent work assignment history, etc.) performance within the contact center and/or an agent's current availability. In some embodiments, the state monitor 124 may provide KPI information that is obtained from the work assignment engine 120 or from some other analysis and reporting module running within the contact center. As used herein, KPIs may include, without limitation, any metric or combination of metrics that define performance of an entity within a contact center (e.g., a contact center agent, a group of contact center agents, etc.). Specifically, a KPI can be defined in terms of making progress toward strategic goals or simply the repeated achievement of some level of an operational goal.

The behavior analysis module 124 may also be configured to analyze one or more KPIs of a work item or a collection of work items within the contact center. For instance, the state monitor 124 may be configured to analyze WAT for a group of work items, actual wait time for a work item, estimated wait time for a work item, etc.

In a contact center context, KPIs may vary depending upon whether work items correspond to outbound contacts (e.g., contacts originated by the contact center) or inbound contacts (e.g., contacts received at the contact center that have been originated outside the contact center). Non-limiting examples of outbound contact KPIs include: Contacts per hour—Average number of customers a call center agent was able to contact within an hour; Leads Conversion Rate—The percentage of leads that actually converted to sales; Hourly Sales—The average amount of sales the call center representative was able to close in an hour; Daily Sales—The average value of sales the agent was able to close in a day; and Accuracy—Extent to which a contact has been handled according to a predetermined script.

Non-limiting examples of inbound contact KPIs include: Real time Q—Metrics; Calls per hour—The average number of calls the agent is able to take per hour; Saves/One-Call Resolutions—The number of times our agents are able to resolve an issue immediately within the first phone call. Colloquially referred to as "one-and-done" calls; Average Handle Time—How long it takes for one call to be handled, which includes the call time itself, plus the work done after that call; Average Wait Time—How long a caller is put on hold before a call center agent becomes available to take the call; Accuracy; Abandonment Rate—This is the percentage of customers who disconnected before an agent was able to intercept the call; and Completion Rate—The ratio of successfully finished calls to the number of attempted calls by the customer.

Other types of KPIs that are not necessarily specific to inbound or outbound contacts include, without limitation, customer satisfaction level, customer service level, average speed of answer, contact forecast precision level, quality of services rendered, average handling cost of a contact, agent occupancy ratio, schedule adherence and conformity, and time distribution (in service, non-service detailed time or "shrinkage"). Other examples include number of times calls are put on hold, number of transfers, $/min, $/call, number of upsells, number of cross-sells, etc.

As can be appreciated, the behavior analysis module 124 may be internal to the work assignment mechanism 116 or they may be separate from the work assignment mechanism 116. Likewise, certain components of the work assignment engine 120 and/or simulation equipment 140 do not necessarily need to be executed within a specific component of the communication system 100 and may be executed in different parts of the communication system 100 without departing from the scope of the present disclosure.

Figure 3:
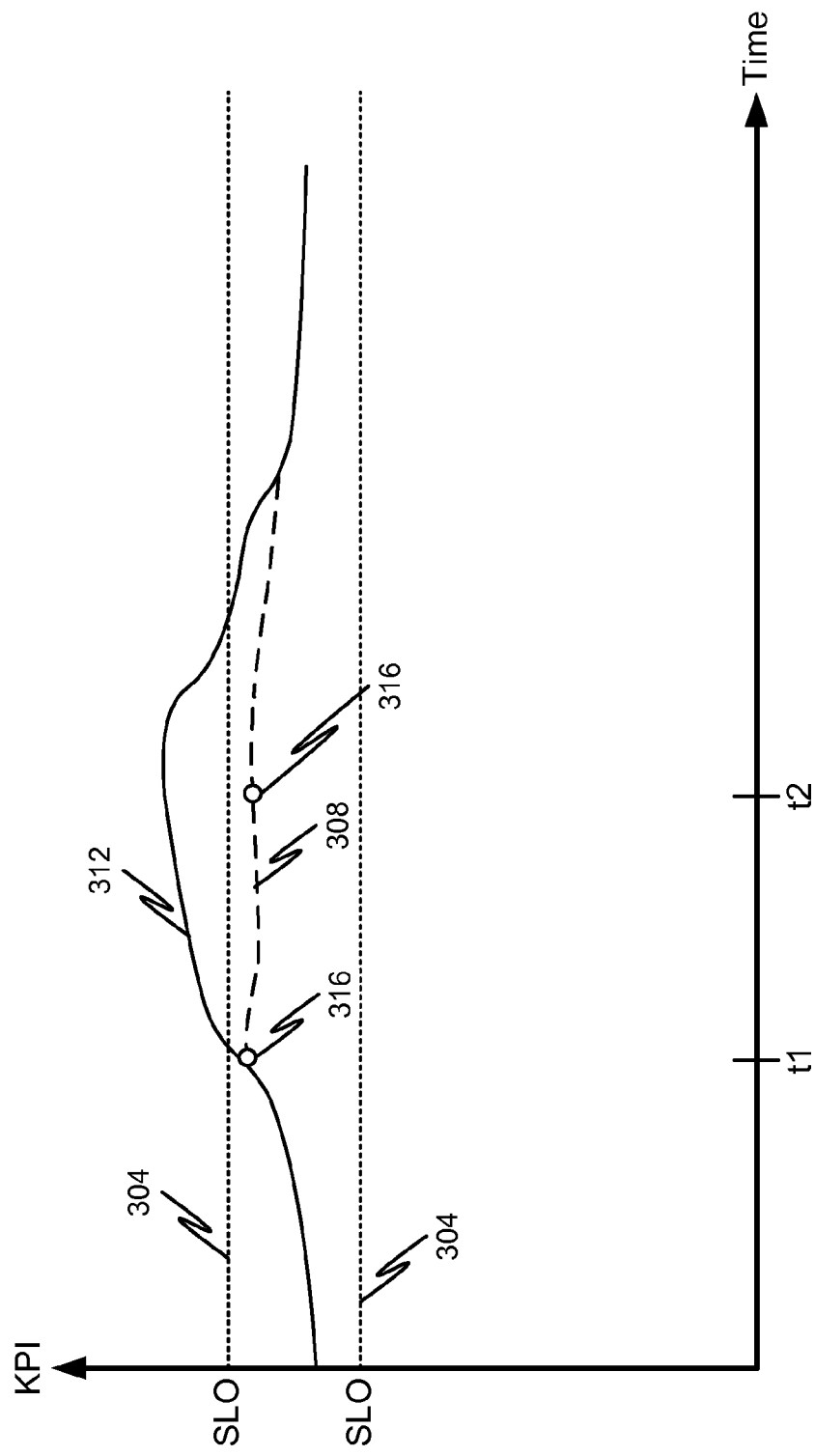
FIG. 3 is a chart depicting differences in contact center behavior under different work assignment algorithms in accordance with embodiments of the present disclosure.

With reference now to FIG. 3, additional details concerning the operation of the contact center behavior analysis module 124 will be described in accordance with embodiments of the present disclosure. In particular, FIG. 3 depicts one way of describing a contact center's behavior over time (e.g., as a KPI versus time chart). The values monitored on the y-axis of the chart may correspond to any type of known KPI or collection of KPIs. As is well known in the contact center arts, one or more KPI metrics or values will vary as work flow in the contact center changes. For example, as the volume of work items increases (e.g., during a spike in incoming contacts), the expected waiting time for contacts may also increase if the number of resources 112 available to process the work items does not also increase.

FIG. 3 shows that for a certain KPI, one or more SLOs 304 may be established. The SLOs 304 may correspond to a predetermined value or target for a KPI, a range of acceptable values for a KPI (e.g., upper and/or lower bounds for the KPI), a minimum acceptable value for a KPI, a maximum acceptable value for a KPI, situational KPIs, multi-tiered KPIs, or the like.

As time progresses and the volume and type of work entering the contact center changes, there may be a situation where one work assignment algorithm (e.g., first work assignment algorithm 136a) performs an adaptive function 316. At this instance of time (e.g., t1), the behavior of the contact center in response to decisions from the first assignment algorithm (depicted in the first behavior line 308) may change as compared to the behavior of the contact center in response to decisions from the second assignment algorithm (depicted in the second behavior line 312). As can be seen in FIG. 3, an adaptive function 316 may be performed by an algorithm more than once for a given work flow 204.

As discussed herein, an adaptive function 316 may correspond to any action or set of actions initiated by an algorithm within the contact center. Examples of an action or set of actions resulting in an adaptive function 316 include, without limitation, assigning one or more new resources 112 to a queue, changing queue assignments of a resource or multiple resources 112, adding a resource 112 to the contact center (e.g., using contract agents, outsourcing work assignments, activating an "on-call" agent, etc.), or combinations thereof.

At the first instance in time t1 where the first work assignment algorithm 136a performs an adaptive function 316, it can be seen that the measured KPI in the first behavior line 308 does not exceed the upper boundary SLO 304. On the other hand, the second behavior line 312 continues its upward trajectory and the upper boundary SLO 304 is exceeded. Depending upon the SLO 304 and the KPI associated therewith, this may provide an indication that the contact center is performing poorly (e.g., not in line with predefined standards and objectives).

The upward trajectory of the second behavior line 312 still continues and it can be seen that the differences in contact center behavior under the first work assignment algorithm 136a as compared to the contact center behavior under the second work assignment algorithm 136b become more pronounced. In particular, the adaptive function 316 taken at the first instance in time t1 may have allowed other agents to get caught up with their work and the beneficial effects have continued beyond the first instance in time t1. Stated another way, the failure of the second work assignment algorithm 136b to perform an adaptive function 316 may compound the problems that the contact center agents are encountering and the performance of the contact center becomes progressively worse. As an example, without the adaptive function 316, more customers may have been more upset when they were finally connected with an agent. This increased frustration caused by having to wait longer may cause the interaction with the agent to take longer than if the customer were assigned to an agent more quickly. Thus, the positive benefits associated with the adaptive function 316 propagate beyond the first instance in time t1.

If the incoming call volume continues to increase, the first work assignment algorithm 136a may invoke a second adaptive function at a second instance in time t2 after the first instance in time t1. Thus, there is no limit on the number of adaptive functions 316 that may be performed by the first work assignment algorithm 136a. It can be seen that multiple adaptive functions 316 may continue to ensure that the SLOs 304 of the contact center are not violated and the contact center continues to behave properly.

As time progresses and the volume of incoming calls decreases, it may be possible that the contact center behavior lines 308 and 312 re-align with one another. As the volume decreases, the first work assignment algorithm 136a may perform yet another adaptive function 316 (not shown) that removes one or more agents from the skill that was under duress thereby placing the contact center back into the same state as it was before the first adaptive function 316 was performed at the first instance of time t1.

Figure 4:
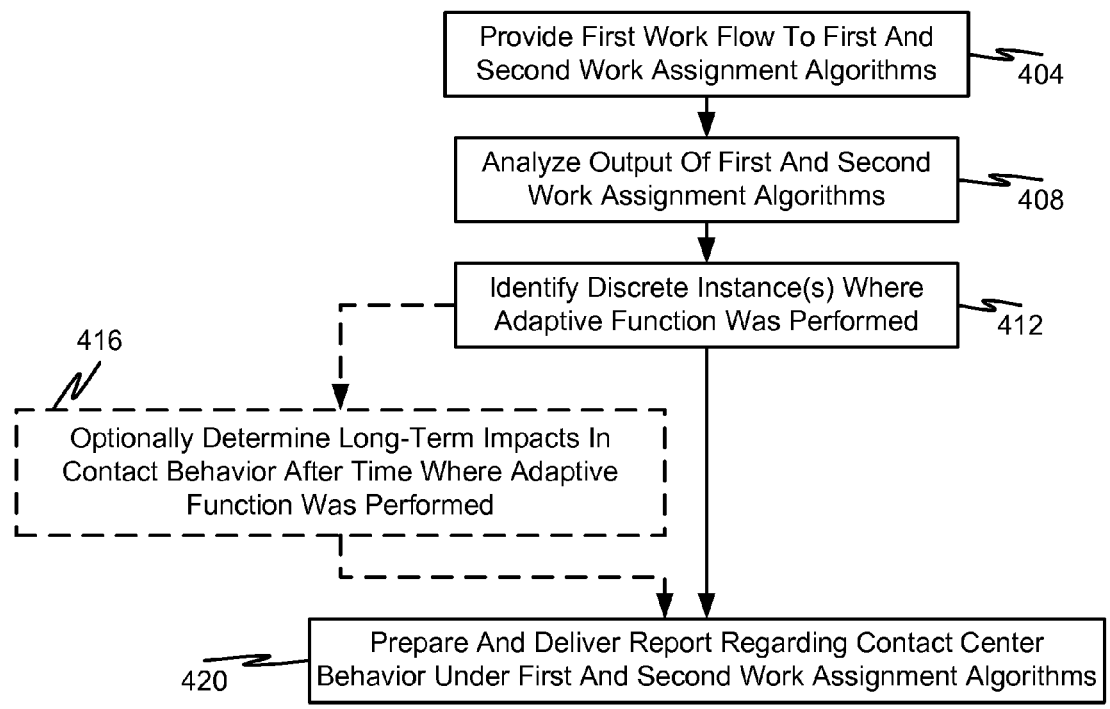
FIG. 4 is a flow diagram depicting a method of analyzing contact center behavior in accordance with embodiments of the present disclosure.

With reference now to FIG. 4, a method of analyzing contact center behavior will be described in accordance with at least some embodiments of the present disclosure. The method begins by providing the first work flow 204 to both the first and second work assignment algorithms 136a, 136b (step 404). The first work flow 204 may be provided to the work assignment algorithms 136a, 136b within the work assignment engine 120 and/or within the simulation equipment 140. The outputs 208a, 208b of the work assignment algorithms 136a, 136b are then analyzed by the behavior analysis module 124 (step 408). In particular, the behavior analysis module 124 may analyze one or more contact center KPIs in response to the contact center following the first work assignment algorithm 136a as well as one or more contact center KPIs in response to the contact center following the second work assignment algorithm 136b. Again, the behavior may correspond to actual behavior of the contact center or simulated behavior. In some embodiments, the behavior analysis module 124 may analyze the behavior lines 308, 312 or any other KPI reports that can be generated using traditional contact center reporting techniques. The KPIs and/or reports analyzed by the behavior analysis module 124 may correspond to historical reports or real-time analytics reports.

Based on its analysis of the contact center behavior under both algorithms 136a, 136b, the behavior analysis module 124 is capable of identifying discrete instance(s) where an adaptive function 316 was performed by one or both of the algorithms 136a, 136b (step 412). Since the algorithms 136a, 136b are different from one another, the point(s) in time where one algorithm performs an adaptive function 316 may not necessarily correspond to a point in time where the other algorithm performs an adaptive function 316.

Following step 412, an optional step may be performed where the behavior analysis module 124 determines long-term impacts in contact center behavior (step 416). In particular, the behavior analysis module 124 determines the differences in behavior lines 308, 312 for a predetermined amount of time after the instance in time where the adaptive function 316 occurred. As an example, the behavior analysis module 124 may continue to monitor the behavior lines 308, 312 until they again merge. As another example, the behavior analysis module 124 may continue to monitor the behavior lines 308, 312 and determine the differences there between until both behavior lines 308, 312 are in conformance with the defined SLO(s) 304. The extended analysis of the behavior lines 308, 312 can help the behavior analysis module 124 determine what additional impacts the adaptive function 316 had on the contact center behavior or what additional impacts the failure of to perform an adaptive function 316 had on the contact center behavior.

Based on the information obtained in steps 412 and optionally in step 416, the behavior analysis module 124 may prepare and deliver one or more reports to one or more interested parties (step 420). In some embodiments, the behavior analysis module 124 may prepare a report that identifies the number of times an adaptive function 316 was performed by a work assignment algorithm 136a, 136b, when an adaptive function 316 was performed, what long-term effects the adaptive function 316 had on contact center behavior, how long it took for the contact center behavior to come back into conformance with the relevant SLO(s) 304, and combinations thereof. The report may be delivered in an electronic format (e.g., message content within an electronic message, as a file attachment to an electronic message, as a file saved in a predetermined location in memory, etc.). The party to whom the report is delivered may include a contact center administrator, a potential purchaser of the work assignment algorithm that performed the adaptive function(s) 316, a contact center provider, or any other person having an interest in the performance of the contact center.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
providing a first work flow to a first work assignment algorithm;
providing the first work flow to a second work assignment algorithm;
analyzing, by a microprocessor executable behavior analysis module, a contact center behavior in response to the first work assignment algorithm processing the first work flow;
analyzing, by the microprocessor executable behavior analysis module, the contact center behavior in response to the second work assignment algorithm processing the first work flow; and
based on the analysis of the contact center behavior in response to both the first and second work assignment algorithms processing the first work flow, identifying, by the microprocessor executable behavior analysis module, at least one discrete point in time where the first work assignment algorithm performs an adaptive function and the second work assignment algorithm does not perform the adaptive function, wherein the adaptive function, when performed, prevents violation, by the contact center, of a performance objective that would be violated by the contact center in the absence of performance of the adaptive function.

2. The method of claim 1, wherein the adaptive function comprises at least one of the first work assignment algorithm assigning one or more new resources to a queue, changing queue assignments of a resource, changing queue assignments of multiple resources, adding a resource to the contact center, and removing a resource from the contact center.

3. The method of claim 2, wherein the adaptive function is performed in response to the first work assignment algorithm determining that at least one service level objective will be violated.

4. The method of claim 1, further comprising:
preparing a report that describes how many adaptive functions the first work assignment algorithm performed and when each adaptive function was performed; and
providing the report to at least one interested party via at least one electronic message.

5. The method of claim 4, wherein the report also describes a difference in the contact center behavior for a predetermined amount of time extending beyond the at least one discrete point in time where the adaptive function was performed.

6. The method of claim 5, wherein the predetermined amount of time corresponds to an amount of time required for the contact center behavior to come into compliance with at least one service level objective in response to the second work assignment algorithm processing the first work flow.

7. The method of claim 1, wherein the first work flow corresponds to real-time work flow in the contact center.

8. The method of claim 7, wherein both the first and second work assignment algorithms process the real-time work flow but only an output of the first work assignment algorithm is provided to a routing engine in the contact center to execute the results of the first work assignment algorithm processing the real-time work flow.

9. The method of claim 1, wherein the first work flow corresponds to simulated work flow.

10. A non-transitory computer readable medium having stored thereon microprocessor executable instructions for a behavior analysis module that causes a computing system to execute a method, the microprocessor executable instructions comprising:
instructions configured to provide a first work flow to a first work assignment algorithm;
instructions configured to provide the first work flow to a second work assignment algorithm;
instructions configured to analyze a contact center behavior in response to the first work assignment algorithm processing the first work flow;
instructions configured to analyze the contact center behavior in response to the second work assignment algorithm processing the first work flow; and
instructions configured to, based on the analysis of the contact center behavior in response to both the first and second work assignment algorithms processing the first work flow, identify at least one discrete point in time where the first work assignment algorithm performs an adaptive function and the second work assignment algorithm does not perform the adaptive function, wherein the adaptive function, when performed, prevents violation, by the contact center, of a performance objective that would be violated by the contact center in the absence of performance of the adaptive function.

11. The computer readable medium of claim 10, wherein the adaptive function comprises at least one of the first work assignment algorithm assigning one or more new resources to a queue, changing queue assignments of a resource, changing queue assignments of multiple resources, adding a resource to the contact center, and removing a resource from the contact center.

12. The computer readable medium of claim 11, wherein the adaptive function is performed in response to the first work assignment algorithm determining that at least one service level objective will be violated.

13. The computer readable medium of claim 12, further comprising:
instructions configured to prepare a report that describes how many adaptive functions the first work assignment algorithm performed and when each adaptive function was performed; and
instructions configured to provide the report to at least one interested party via at least one electronic message.

14. The computer readable medium of claim 13, wherein the report also describes a difference in the contact center behavior for a predetermined amount of time extending beyond the at least one discrete point in time where the adaptive function was performed.

15. The computer readable medium of claim 14, wherein the predetermined amount of time corresponds to an amount of time required for the contact center behavior to come into compliance with at least one service level objective in response to the second work assignment algorithm processing the first work flow.

16. The computer readable medium of claim 10, wherein the first work flow corresponds to real-time work flow in the contact center.

17. The computer readable medium of claim 16, wherein both the first and second work assignment algorithms process the real-time work flow but only an output of the first work assignment algorithm is provided to a routing engine in the contact center to execute the results of the first work assignment algorithm processing the real-time work flow.

18. A contact center, comprising:
- a first work assignment algorithm configured to process a first work flow and produce a first output in response thereto;
- a second work assignment algorithm configured to process the first work flow and produce a second output in response thereto, wherein the first output results in a first contact center behavior and the second output results in a second contact center behavior different from the first contact center behavior; and
- a behavior analysis module configured to analyze the first contact center behavior and the second contact center behavior and, in response thereto, identify at least one discrete point in time where the first work assignment algorithm performs an adaptive function and the second work assignment algorithm does not perform the adaptive function, wherein the adaptive function, when performed, prevents violation, by the contact center, of a performance objective that would be violated by the contact center in the absence of performance of the adaptive function.

19. The contact center of claim 18, wherein the adaptive function comprises at least one of the first work assignment algorithm assigning one or more new resources to a queue, changing queue assignments of a resource, changing queue assignments of multiple resources, adding a resource to the contact center, and removing a resource from the contact center, wherein the adaptive function is performed in response to the first work assignment algorithm determining that at least one service level objective will be violated.

20. The contact center of claim 18, further comprising simulation equipment that executes one or more of the first work assignment algorithm and the second work assignment algorithm.

* * * * *